(12) United States Patent
Bonetta et al.

(10) Patent No.: US 10,417,036 B2
(45) Date of Patent: Sep. 17, 2019

(54) EVALUATION TECHNIQUES FOR FAST ACCESS TO STRUCTURED, SEMI-STRUCTURED AND UNSTRUCTURED DATA USING A VIRTUAL MACHINE THAT PROVIDES SUPPORT FOR DYNAMIC CODE GENERATION

(71) Applicant: Oracle International Corporation, Redwood Shores, CA (US)

(72) Inventors: Daniele Bonetta, Linz (AT); Matthias Brantner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/864,863

(22) Filed: Jan. 8, 2018

(65) Prior Publication Data

US 2018/0246752 A1    Aug. 30, 2018

Related U.S. Application Data

(60) Provisional application No. 62/463,417, filed on Feb. 24, 2017.

(51) Int. Cl.
*G06F 9/455*     (2018.01)
*G06F 8/30*      (2018.01)
(Continued)

(52) U.S. Cl.
CPC .......... *G06F 9/45558* (2013.01); *G06F 8/30* (2013.01); *G06F 9/4552* (2013.01); *G06F 16/20* (2019.01); *G06F 16/80* (2019.01); *G06F 9/45541* (2013.01)

(58) Field of Classification Search
None
See application file for complete search history.

(56) References Cited

U.S. PATENT DOCUMENTS 5,794,030 A * 8/1998 Morsi .................. G06F 16/289
7,287,033 B2 * 10/2007 Shadmon ............... G06F 16/30
(Continued)

FOREIGN PATENT DOCUMENTS

CN    106156353 A    11/2016

OTHER PUBLICATIONS

Bonetta, Daniele, and Matthias Brantner. "FAD.js: Fast JSON Data Access Using JIT-based Speculative Optimizations." Proceedings of the VLDB Endowment 10.12 (2017). (Year: 2017).*
(Continued)

*Primary Examiner* — Matthew J Brophy
(74) *Attorney, Agent, or Firm* — Hickman Palermo Becker Bingham LLP

(57) ABSTRACT

Computer-implemented techniques described herein provide fast access to structured, semi-structured, and unstructured data using a virtual machine that provides support for dynamic code generation. In an embodiment, a virtual machine allows for the efficient encoding of data objects into hierarchically marked up data. A virtual machine is configured to dynamically create attributes of objects referenced by a body of code and hidden classes used to store attributes of objects referenced by the body of code. The virtual machine will determine whether a hidden class of an object satisfies one or more encoding criteria for encoding instances of objects with the hidden class. Encoding machine code is generated and executed to encode instances of objects with the hidden class. In another embodiment, direct structure decoding enables the generation of efficient machine code that is specialized for accessing only a subset of the input data that is used by an application. A parse operation is received to parse a hierarchical data object and a proxy object is created in a runtime memory space that references the hierarchical data object. It is then determined
(Continued)

that the hierarchical data object is syntactically valid, and in response to receiving a request to read a property of the hierarchical data object, a subset of hierarchical data from the hierarchical data object is parsed to materialize a value of the property in the proxy object.

20 Claims, 5 Drawing Sheets

(51) Int. Cl.
*G06F 16/20* (2019.01)
*G06F 16/80* (2019.01)

(56) References Cited

U.S. PATENT DOCUMENTS

| | | | | |
|---|---|---|---|---|
| 8,639,743 | B1* | 1/2014 | Colton | G06F 9/45525 709/203 |
| 8,880,990 | B2* | 11/2014 | Masuko | G06F 17/2247 715/204 |
| 8,881,146 | B2* | 11/2014 | Padmanabhuni | G06F 9/45558 711/173 |
| 8,887,127 | B2* | 11/2014 | Lee | G06F 9/45529 717/106 |
| 9,021,455 | B2* | 4/2015 | Chapman | G06F 9/45516 717/158 |
| 9,037,614 | B1* | 5/2015 | Parrott | G06F 16/211 707/803 |
| 9,110,970 | B2* | 8/2015 | Mohan | G06F 16/288 |
| 9,497,136 | B1* | 11/2016 | Ramarao | G06F 9/45558 |
| 9,558,214 | B1* | 1/2017 | Parrott | G06F 16/211 |
| 9,678,729 | B2* | 6/2017 | Goetz | G06F 9/4488 |
| 9,760,350 | B2* | 9/2017 | Lagergren | G06F 9/45516 |
| 9,766,926 | B2* | 9/2017 | Bonetta | G06F 9/38 |
| 2005/0273772 | A1* | 12/2005 | Matsakis | G06F 8/41 717/136 |
| 2008/0022267 | A1* | 1/2008 | Johnson, Jr. | G06F 8/38 717/143 |
| 2009/0007160 | A1* | 1/2009 | Wei | G06F 8/41 719/328 |
| 2009/0307239 | A1* | 12/2009 | Chandrasekar | G06F 16/83 |
| 2010/0306207 | A1* | 12/2010 | Li | G06F 17/2247 707/756 |
| 2010/0333085 | A1* | 12/2010 | Criddle | G06F 9/455 717/178 |
| 2011/0264560 | A1* | 10/2011 | Griffiths | G06Q 10/06 705/27.1 |
| 2012/0284288 | A1* | 11/2012 | Bickle | G06F 8/423 707/755 |
| 2013/0086569 | A1* | 4/2013 | Chapman | G06F 9/45516 717/158 |
| 2013/0139151 | A1* | 5/2013 | Criddle | G06F 9/455 717/178 |
| 2013/0145254 | A1* | 6/2013 | Masuko | G06F 17/2247 715/234 |
| 2013/0174132 | A1* | 7/2013 | Fenicle | G06F 9/445 717/140 |
| 2013/0325904 | A1* | 12/2013 | Clifford | G06F 8/437 707/801 |
| 2015/0081988 | A1* | 3/2015 | Bonetta | G06F 9/38 711/155 |
| 2015/0142846 | A1* | 5/2015 | Levine | G06F 16/2471 707/769 |
| 2015/0254068 | A1* | 9/2015 | Bickle | G06F 8/61 717/175 |
| 2015/0301807 | A1* | 10/2015 | Goetz | G06F 9/4488 717/140 |
| 2015/0378694 | A1* | 12/2015 | Lagergren | G06F 9/45516 717/143 |
| 2017/0141791 | A1* | 5/2017 | Balegar | G06F 16/2246 |
| 2018/0052692 | A1* | 2/2018 | Leenhouwers | G06F 8/427 |
| 2018/0165364 | A1* | 6/2018 | Mehta | G06F 9/54 |
| 2018/0246752 | A1* | 8/2018 | Bonetta | G06F 9/45558 |
| 2019/0065552 | A1 | 2/2019 | Brantner | |

OTHER PUBLICATIONS

Daloze, Benoit, et al. "Efficient and thread-safe objects for dynamically-typed languages." ACM SIGPLAN Notices. vol. 51. No. 10. ACM, 2016. (Year: 2016).*
Gal, Andreas, et al. "Trace-based just-in-time type specialization for dynamic languages." ACM SIGPLAN Notices. vol. 44. No. 6. ACM, 2009. (Year: 2009).*
L. P. Deutsch et al., "Efficient Implementation of the Smalltalk-80 System", In Proc. of POPL, dated 1984, 6 pages.
A. V. Aho et al., "Compilers: Principles, Techniques, and Tools", Addison-Wesley Longman Publishing Co., Inc., Boston, MA, USA, dated 1986, 1038 pages.
A. Wob et al., "An Object Storage Model for the Truffle Language Implementation Framework", In Proc. of PPPJ, pp. 133{144. ACM, dated 2014, 12 pages.
D. Simon et al., "Snippets: Taking the High Road to a Low Level", ACM TECO,, dated Jun. 2015, 25 pages.
F. Farfan et al., "Beyond Lazy Xml Parsing", In Proc. of DEXA, dated 2007, 10 pages.
F. Pezoa et al., "Foundations of JSON Schema", In Proc. Of WWW, dated 2016, 11 pages.
A. Marian et al., "Projecting XML Documents", In Proc. of VLDB, dated 2003, 12 pages.
K. Czarnecki et al., "Generative Programming and Active Libraries", In International Seminar on Generic Programming, London, UK, dated 2000. Springer, 15 pages.
Zaharia et al., Apache Spark: A United Engine for Big Data Processing. Commun. ACM, dated Oct. 2016, 10 pages.
L. Stadler et al., "Optimizing R Language Execution Via Aggressive Speculation", In Proc. of DLS, dated 2016, 12 pages.
M. L. Noga et al., "Lazy Xml Processing", In Proc. of DocEng, dated 2002, 8 pages.
S. Newman. "Building Microservices". O'Reilly Media, Inc., 1st edition, dated 2015, dated 473 pages.
T. Wurthinger et al., "One Vm to Rule them All", In Proc. Of ONWARD, dated 2013, 18 pages.
U. Hoolzle et al., "Optimizing Dynamically-typed Object-oriented Languages with Polymorphic Inline Caches", In Proc. of ECOOP, dated 1991, 18 pages.
Y. Futamura. "Partial evaluation of computation Process & Mdash", anapproach to a compiler-compiler. Higher Order Symbol Computer, dated Dec. 1999, 11 pages.
I. Alagiannis et al., "NoDB in Action: Adaptive Query Processing on Raw Data", Proc. VLDB Endow, dated Aug. 2012, 4 pages.

* cited by examiner

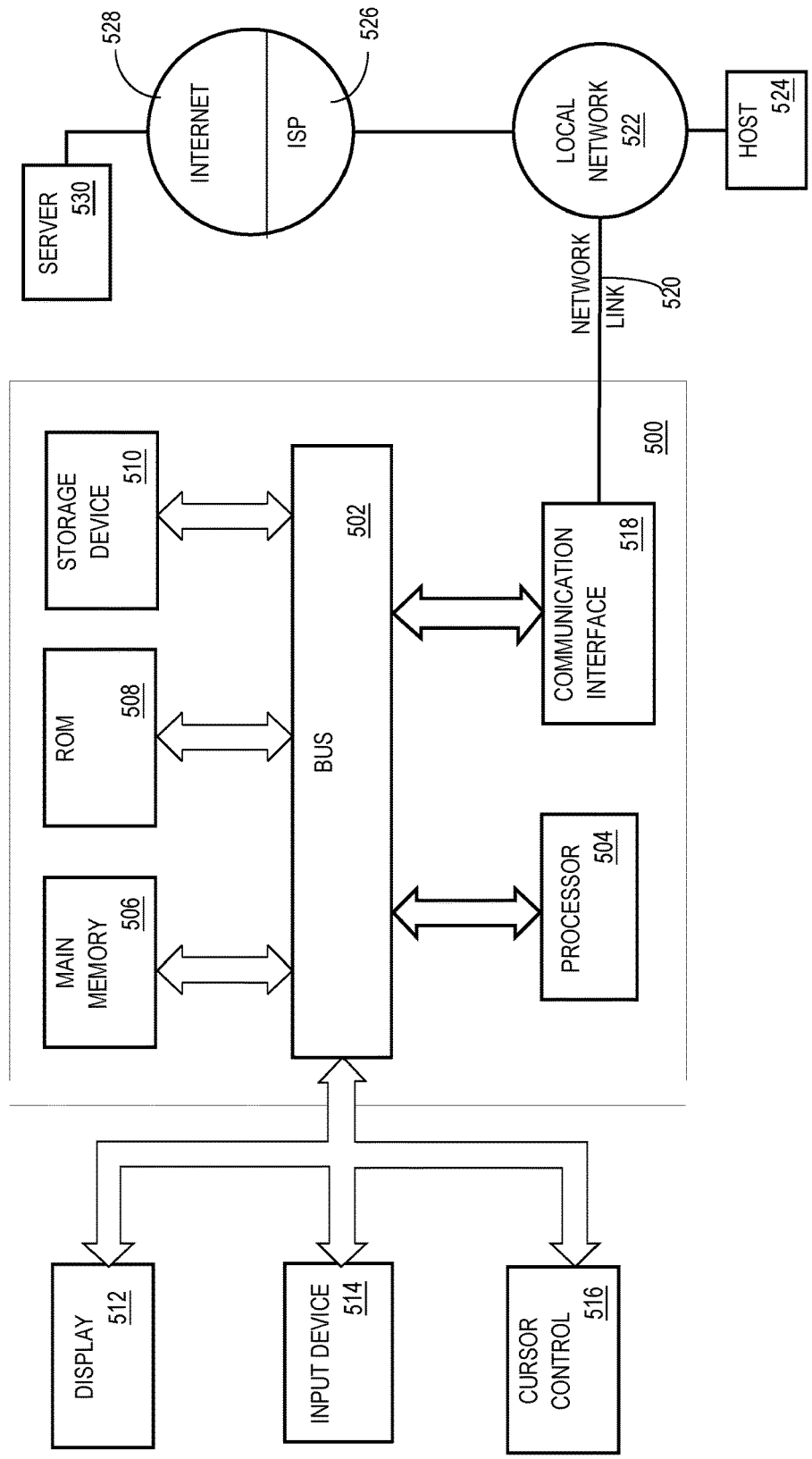

EVALUATION TECHNIQUES FOR FAST ACCESS TO STRUCTURED, SEMI-STRUCTURED AND UNSTRUCTURED DATA USING A VIRTUAL MACHINE THAT PROVIDES SUPPORT FOR DYNAMIC CODE GENERATION

CROSS-REFERENCE TO RELATED APPLICATIONS; BENEFIT CLAIM

This application claims priority to U.S. Provisional Application No. 62/463,417, filed on Feb. 24, 2017, the entire contents of which is hereby incorporated by reference as if fully set forth herein, under 35 U.S.C. § 119(e).

FIELD OF THE INVENTION

Embodiments relate generally to techniques for optimizing encoding and decoding operations.

BACKGROUND

Hierarchical data encoding formats such as JSON and XML are often used as encoding formats to represent different forms of data. Data-intensive systems and applications heavily rely on hierarchical data encoding formats to function.

For example, key-value databases and Big Data analytics frameworks often use hierarchical data encoding formats to represent semi-structured data. Cloud based and web technologies also used hierarchical markup data encoding formats such as JSON as the main encoding format in client-server communications as well as in microservices applications.

In the majority of scenarios where hierarchical data encoding formats are employed, they are used as the boundary between a data source and a language runtime such as a JavaScript/Node.js virtual machine. Interactions between the language runtime and data source can often become a performance bottleneck for applications that need to produce or consume significant amounts of hierarchically marked-up data.

If the hierarchically marked-up data resides in a data source that is external to the memory space of the language runtime, the language runtime must materialize the data in its language-private heap memory space before consuming the data.

Additionally, encoding and decoding libraries in modern language runtimes often rely on general-purpose techniques that do not consider the structure of the data that they are manipulating. The adoption of such general-purpose libraries is mostly motivated by the fact that hierarchical data encoding formats are used in the context of dynamic languages such as JavaScript or Python, where it is not possible to know in advance the characteristics of the hierarchical data that will be processed by the application.

In other words, such applications do not use a pre-defined schema that could be used to speed up data access. However, the lack of a pre-defined schema does not necessarily imply that some form of structure could emerge in the way hierarchical data is created or accessed at runtime. Very often, a hidden schema may exist at runtime for dynamic languages.

Based on the foregoing, an approach for generating optimizations for applications that present hidden schemas at runtime is desired.

BRIEF DESCRIPTION OF THE DRAWINGS

In the drawings:

FIG. 5 depicts a computer system upon which an embodiment may be implemented.

DETAILED DESCRIPTION

Figure 1:
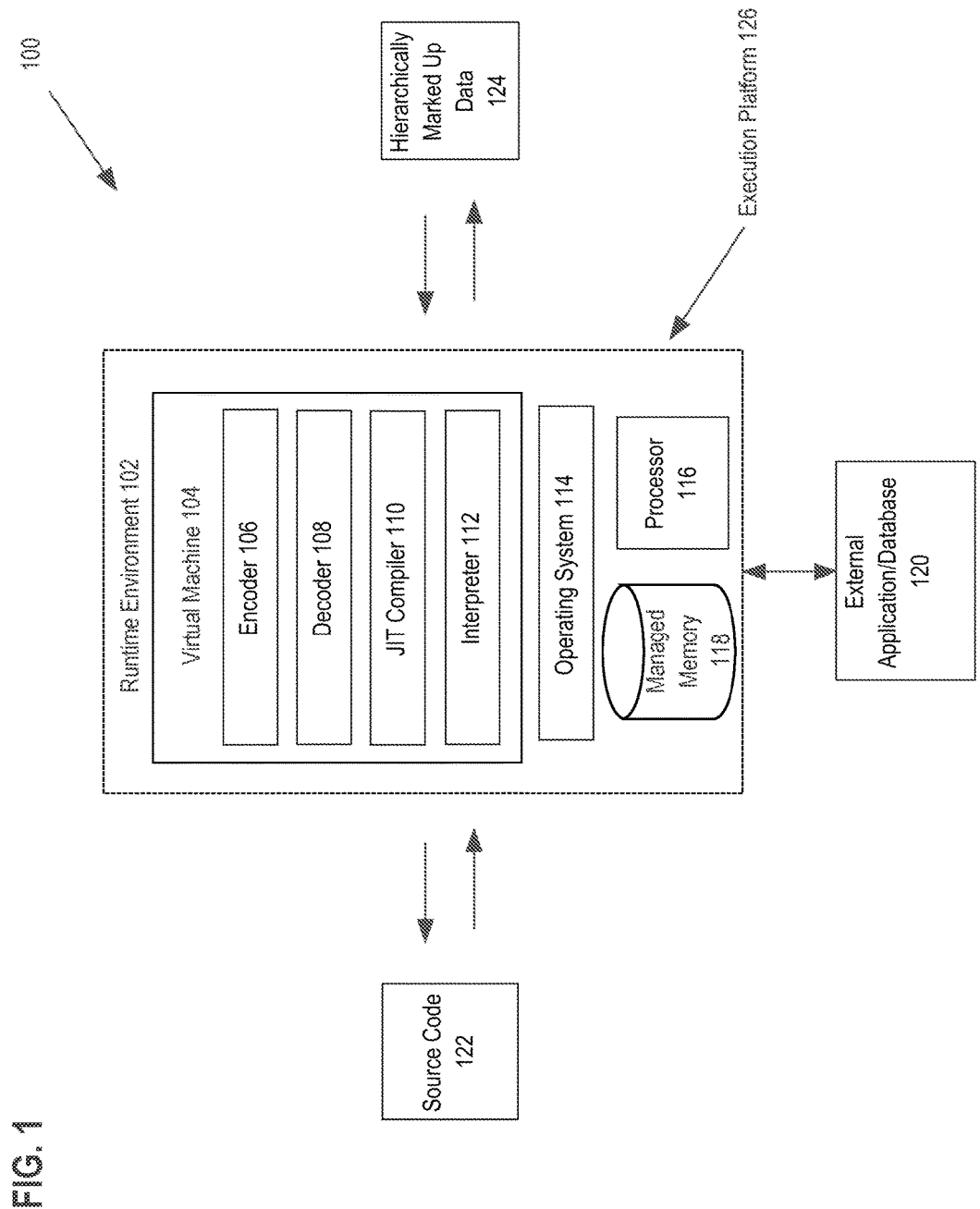
FIG. 1 is a block diagram illustrating an example computing system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques described herein provide fast access to structured, semi-structured, and unstructured data using a virtual machine that provides support for dynamic code generation. In an embodiment, a computer implemented method comprises: a virtual machine executes a body of code, wherein said virtual machine is configured to dynamically create attributes of objects referenced by said body of code and hidden classes used to store attributes of said objects referenced by said body code, wherein said virtual machine executing said body of code includes: determining whether a particular hidden class satisfies one or more encoding criteria for generating encoding machine code for encoding one or more particular instances of said hidden class. In response to determining that said particular determining satisfies said one or more encoding criteria: generating said particular encoding machine code to encode said one or more particular instances, and executing said particular encoding machine code to encode a particular instance of said one or more particular instances.

Various embodiments may include generating an intermediate representation based on the attributes of objects referenced by said body of code, determining whether said hidden class matches an expected hidden class mapped to said intermediate representation, generating said particular encoding machine code based on said intermediate representation, and in response to determining that said particular determining does not satisfy said one or more encoding criteria: generating generic encoding machine code to encode said one or more particular instances, and executing said generic encoding machine code to encode a particular instance of said one or more particular instances.

In one embodiment, a computer implemented method comprises: receiving a parse operation to parse a hierarchical data object, creating an proxy object in a runtime memory space that references the hierarchical data object, determining that the hierarchical data object is syntactically valid, in response to receiving a first request to read a particular property of the hierarchical data object: parsing a subset of hierarchical data from the hierarchical data object to materialize a value of the particular property in the proxy object. In response to receiving a second request to read the particular property of the hierarchical data object: returning the value of the particular property from the proxy object.

In an embodiment, determining that the hierarchical data object is syntactically valid may include determining that the hierarchical data object is syntactically valid without materializing the value of the particular property in the runtime memory space. In another embodiment, determining that the hierarchical data object is syntactically valid includes storing a parsing index in the proxy object, wherein the parsing index includes an array of initial parsing positions of one or more property values in the hierarchical data object.

System Overview

FIG. 1 illustrates an example system 100 in which the described techniques may be practiced, according to an embodiment. FIG. 1 is but one example of a system in which the described techniques may be practiced. Other systems may include fewer or additional elements in varying arrangements.

System 100 comprises an execution platform 126 that includes a runtime environment 102. The runtime environment 102 includes a virtual machine 104 comprising various components, such as an interpreter 112 for executing intermediate code, a just-in-time (JIT) compiler 110 for producing optimized machine-level code such as an encoder 106 or decoder 108. By way of non-limiting example, runtime environment 102 may be Node.js for executing JavaScript-based applications, or a runtime for executing code written in any other suitable language.

In an embodiment, the computing system 100 includes source code files 122 that contain code that has been written in a particular programming language, such as Java, JavaScript, C, C++, C#, Ruby, Perl, and so forth. Thus, the source code files 122 adhere to a particular set of syntactic and/or semantic rules for the associated language. For example, code written in JavaScript adheres to the JavaScript Language Specification. The exact programming language used to write the source code files 122 is generally not critical. Source code files 122 or representations thereof may be used as input to components of the execution platform such as the encoder 106 and may also be output by the execution platform.

In an embodiment, the computing system 100 includes hierarchically marked up data files 124 that represent different forms of data that may be represented by different hierarchical data encoding formats such as XML, or JSON. The exact hierarchical data encoding formats used to represent the data is not critical. Hierarchical marked-up data may be used as input to components of the execution platform 126 such as the decoder 108, and may also be output by the execution platform 126.

In an embodiment, the components or processes of runtime environment 102 are invoked in response to an operating system 114 receiving a request to execute source code 122 that is associated with runtime environment 102. For instance, the operating system 114 may be configured to automatically start executing the runtime environment 102 when receiving requests from an external application or database 120. In an embodiment, the runtime environment 102 may be implemented by compiled code that is embedded directly within a file or files that contain program code. In an embodiment, runtime environment 102 may be a set of components or processes that an operating system 114 persistently executes, or may even be the operating system 114 itself.

In an embodiment, runtime environment 102 may be or include a virtual machine 104 configured to interpret program code in a platform independent language, and issue instructions to a processor, such as processor 116, that cause the processor 116 to implement the source code 112 or execute the encoder 106 or decoder 108. In an embodiment, runtime environment 102 may be or include any type of interpreter 112 configured to cause processor 116 to implement code segments. Runtime environment 102 may therefore compile, translate, or otherwise convert higher-level instructions found in source code 112 into lower-level instructions executable by processor 116 and/or by an intermediate component such as an operating system 114.

In an embodiment, the virtual machine 104 includes at least a dynamic compiler or translator, such as the just-in-time compiler 110. The dynamic compiler translates certain portions of source code 122 to compiled code as the source code 122 is being executed. In some embodiments, the runtime system 102 will begin executing source code 122 by interpreting the source code 122. The dynamic compiler will monitor the execution of source code 122 for portions that are frequently repeated, and generate compiled versions of those portions.

In other embodiments, the just-in-time compiler 110 may be used during runtime to dynamically compile an executable encoder 106 or decoder 108. Using techniques described herein, the encoder 106 may be dynamically compiled by the just-in-time compiler 110 and may be optimized to encode data objects included in the memory space of the Virtual Machine 104 into hierarchically marked-up data 124. Using techniques described herein, the decoder 108 may be dynamically compiled by the just-in-time compiler 110 and may be optimized to decode hierarchically marked-up data 124 into data objects based on requests from an external application or database 120. In an embodiment, the encoder 106, decoder 108 may share the same JIT compiler 110. In an embodiment, an application that uses the encoder 106 and the encoder 106 may be compiled into the same piece of compiled code.

In other embodiments, some or all of source code 122 may be code that is already compiled in a form that is directly executable by a processor 116 or intermediate operating system 114.

In an embodiment, processor 116 or an intermediate component such as an operating system 114 allocates a managed memory area 118 for use by the runtime environment 102.

Hierarchical Data Encoding Formats

Hierarchical Data Encoding Formats such as XML and JSON may be used as encoding formats to represent different forms of data and are often used as the boundary between a data source and a language runtime.

Data structured using a hierarchical data encoding format is composed of nodes. Nodes are delimited by a set of delimiters that mark the nodes, and may be tagged with names, referred to herein as tag names. In general, the syntax of hierarchical data encoding formats specify that tag names are embedded, juxtaposed, or otherwise syntactically associated with delimiters that delimit nodes.

For XML data, a node is delimited by start and end tags that comprise tag names. For example, in the following XML fragment X,

```
<ZIPCODE>
    <CODE>95125</CODE>
    <CITY>SAN JOSE</CITY>
    <STATE>CA</STATE>
</ZIPCODE>
``` the start tag <ZIP CODE> and the end tag </ZIP CODE> delimit a node having the name ZIP CODE.

The data between the corresponding tags is referred to as a node's content. For a data node, the content can be a scalar value (e.g. integer, text string, date).

A non-leaf node, such as an element node, contains one or more other nodes. For an element node, the content can be a data node and/or one or more element nodes.

ZIPCODE is an element node that contains child nodes CODE, CITY, and STATE, which are also element nodes. Data nodes 95125, SAN JOSE, and CA are data nodes for element nodes CODE, CITY, and STATE, respectively.

The nodes contained by a particular node are referred to herein as descendant nodes of the particular node. CODE, CITY, and STATE are descendant nodes of ZIPCODE. 95125 is a descendant node of CODE and ZIPCODE, SAN JOSE is a descendant node of CITY and ZIPCODE, and CA is a descendant node of STATE and ZIPCODE.

A non-leaf node thus forms a hierarchy of nodes with multiple levels, the non-leaf node being at the top level. A node at each level is linked to one or more nodes at a different level. Any given node at a level below the top level is a child node of a parent node at the level immediately above the given node. Nodes that have the same parent are sibling nodes. A parent node may have multiple child nodes. A node that has no parent node linked to it is a root node. A node that has no child nodes is a leaf node. A node that has one or more descendant nodes is a non-leaf node.

For example, in container node ZIP CODE, node ZIP CODE is a root node at the top level. Nodes 95125, SAN JOSE, and CA are leaf nodes.

The term "hierarchical data object" is used herein to refer to a sequence of one or more non-leaf nodes, each non-leaf node having a child node. An XML document is an example of a hierarchical data object. Another example is a JSON object.

JSON

JSON is a lightweight hierarchical data encoding format. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON nodes and/or values enclosed in square brackets "[]".

An atom, which is a string, number, true, false, or null.

The following JSON hierarchical data object J is used to illustrate JSON.

```
{
    "FIRSTNAME": "JACK",
    "LASTNAME": "SMITH",
    "BORN": {
        "CITY": "SAN JOSE",
        "STATE": "CA",
        "DATE": "11/08/82"
    },
}
```

Hierarchical data object J contains fields FIRSTNAME, LASTNAME, BORN, CITY, STATE, and DATE. FIRSTNAME and LASTNAME have atom string values "JACK" and "SMITH", respectively. BORN is a JSON object containing member fields CITY, STATE, and DATE, which have atom string values "SAN JOSE", "CA", and "11/08/82", respectively.

Each field in a JSON object is a non-leaf node and the name of the non-leaf node is the field name. Each non-empty array and non-empty object is a non-leaf node, each empty array and empty object is a leaf node. Data nodes correspond to an atom value.

Hierarchical data encoding formats such as JSON and XML are often used in context of dynamic languages such as JavaScript or Python where it is not possible to know in advance the characteristics of the data objects or object graphs that will be processed by the application.

Dynamic Languages

A dynamic language is a programming language, which, at runtime, can execute many common programming behaviors that static programming languages perform during compilation. These behaviors could include extending the program by adding new code, extending objects and definitions, or by modifying the type system. Some examples of dynamic languages include JavaScript, Python, PHP, and Ruby.

Dynamic languages may specify different data objects. Data objects may be represented by an object graph, which can be defined as a view of a system of objects at a particular point in time. An object graph may denote relationships of different objects within a system of objects and may be small or large, simple, or complex. For example, an array object that contains a single string object represents a small, simple object graph. A group of objects containing an application object, with references to the windows, menus and their views, and other supporting objects, may represent a large, complex object graph.

Because a property of dynamic languages is that objects and attributes of objects may be extended at runtime, an object graph based on a dynamic language such as JavaScript may also evolve at runtime and can be considered as dynamic.

Just in Time Compilation

Most dynamic languages feature a type of compilation called just in time compilation ("JIT"). Just in time compilation is compilation done during execution of a program—at run time—rather than prior to execution. Most often this consists of translation to machine code, which is then executed directly, but can also refer to translation to another format. A system implementing a JIT compiler typically continuously analyses the code being executed and identifies parts of the code where the speedup gained from compilation would outweigh the overhead of compiling that code.

Hidden Classes

In one or more embodiments of the invention, each object of an object graph has a hidden class, which may also be referred to as an "object shape". Object hidden classes are data structures that record the properties and methods of an object during runtime (i.e., during program execution). In one or more embodiments of the invention, object hidden classes change dynamically during runtime. Object hidden classes may be used to determine information about specific properties of an object during runtime, as objects with the same hidden classes often have properties in common. For example, two objects that have the same hidden class have the same internal layout, meaning that the properties of the objects may be stored in memory in a manner that is consistent between objects, which reduces the need for an operation to determine the structure of the object before performing an action.

For example, consider the following example:

```
// New object. Empty hidden class
Var obj = { }
// hidden class now contains [id:num]
Obj.id = 3;
// hidden class is now [id:num, Name:str]
Obj.name = "foo";
// hidden class is now [id:num, name:str, value:ref]
Obj.value = { };
```

As discussed above, hidden classes evolve at runtime, and encapsulate information about the internal structure of an object instance, that can be used later by the language runtime to produce efficient machine code. For example, by knowing that id is the first property with a numeric type, the JIT compiler can generate machine code that performs the lookup operation in an efficient way (i.e. one memory load at constant offset from the base address of the object), rather than using expensive hash-based lookups (to compute the location of the selected property in the object memory layout).

Constant Structure Encoding

Constant structure encoding is an encoding technique that, based on constant structure assumptions of data objects, allows for the efficient encoding of data objects into hierarchically marked up data.

In previous encoding approaches, a generic encoding library would recursively walk the object graph of a data object, initially reading each property name and successively retrieving for each property name the value associated with it. In doing so, it would append property names and their values to the final JSON or XML string, performing the necessary formatting associated with each value type.

In an embodiment of the present invention, the runtime caches the property names of an input object graph together with the type-related information in an intermediate representation, which is assumed constant, and maps the intermediate representation to the expected hidden class. If the input objects have the expected hidden class that the runtime expects (i.e. they have the properties with the given name and type) the runtime avoids reading the property names of each object as well as their type, and performs the encoding operations by combining constant strings such as the property names with the runtime value of each property. Thus, this embodiment does not require a full scan of the object properties and values for each new object instance with the same structure.

Figure 2:
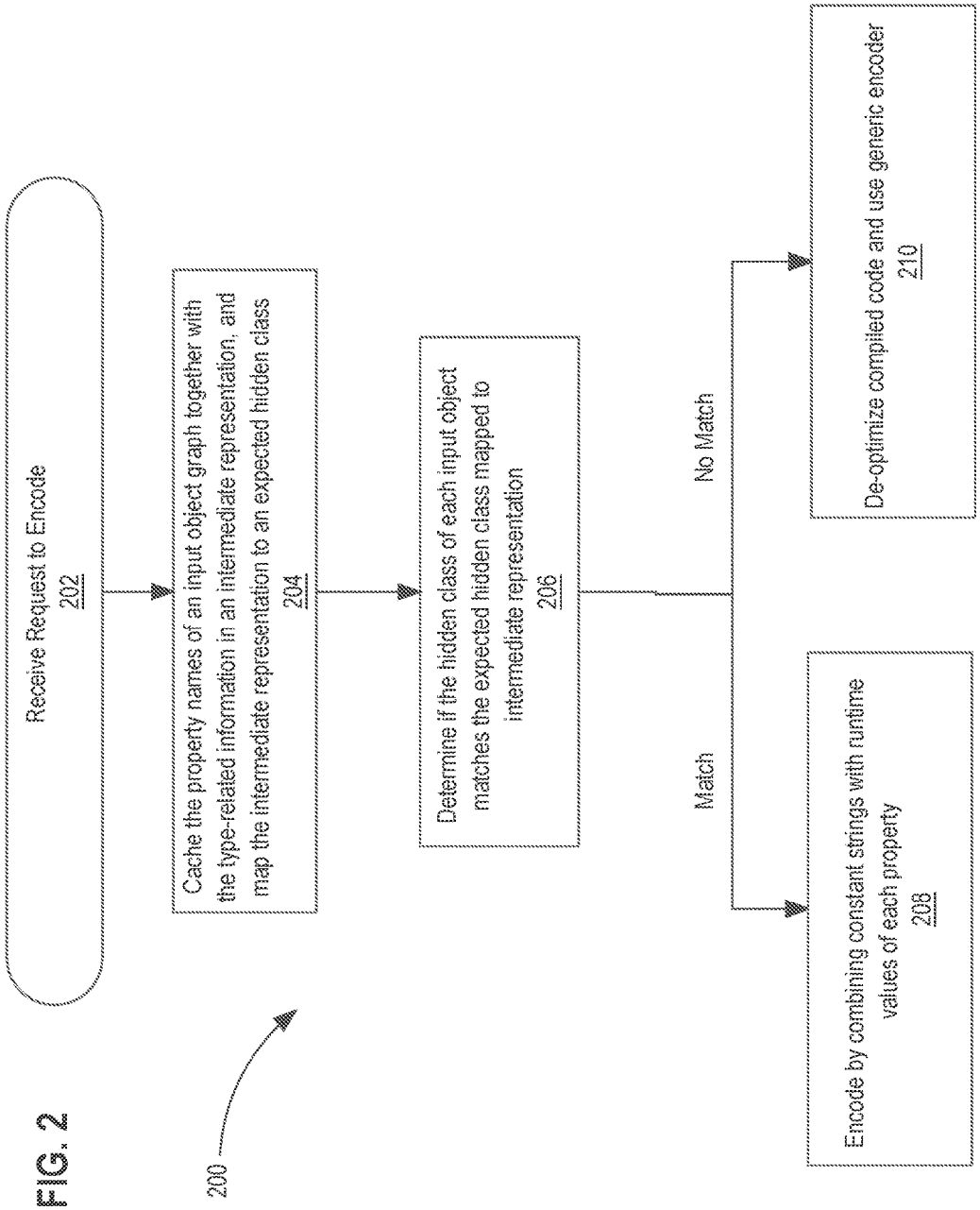
FIG. 2 is flowchart illustrating steps for constant structure encoding.

FIG. 2 shows an example process flow 200 for constant structure encoding. Flow 200 is one example of a flow for constant structure encoding. Other flows may comprise fewer or additional elements, in varying arrangements.

In an embodiment, flow 200 is performed by a virtual machine that is part of the runtime environment.

In step 202, a request is received to encode data into a hierarchical data object. For example, an external application or database 120 may issue a request for data that is encapsulated by source code 122 that may be executing in the execution platform 126, or the request may be issued by the runtime environment 102 via virtual machine 104. The request may also be issued by a piece of compiled code internal to the runtime environment 102 that shares a code base with the encoder 106.

In step 204, the runtime caches the property names and type-related information of an input object graph in an intermediate representation, and maps the intermediate representation to an expected hidden class. For example, the virtual machine 104 via interpreter 112 may generate an intermediate representation of the object graph of the source code 122. The intermediate representation may be based on the property names and types of the object graph that are constant over time. The intermediate representation may be dynamically updated or rewritten by the interpreter 112 during runtime. The intermediate representation may be compiled at runtime into executable machine code such as an encoder 106.

In step 206, it is determined if the hidden class of each input object matches the expected hidden class mapped to the intermediate representation. For example, the virtual machine 104 via the encoder 106 may compare the property names and types of the input data objects from the object graph to the expected hidden class that was previously mapped to the intermediate representation to determine if the property name and types match.

In step 208, if it is determined that the hidden class of input objects match the expected hidden class mapped to the intermediate representation, the object graph is encoded by combining constant strings with the runtime values of each property. For example, if the property names and types of the input objects of the input object graph match the expected property names and types of the intermediate representation that may be represented by the compiled executable encoder 106, the input objects are encoded by combining the constant strings with the runtime values of each property. The constant strings may include the property names with type information.

In step 210, if it is determined that the hidden class of input objects do not match the hidden class mapped to intermediate representation, the compiled code is de-optimized and a generic encoder is used to encode the object graph. For example, if it is determined that the hidden class of the input objects of the input object graph does not match the expected property names and types of the intermediate representation or compiled executable encoder 106, the compiled executable encoder 106 may be de-optimized by the runtime environment 102 via virtual machine 104 and a generic encoder that may not be based on the expected hidden schema may be used to encode the object graph.

Intermediate Representations

In an embodiment, the runtime intermediate representation build is specific to the hidden schema of the input object graphs. In an embodiment, an intermediate representation may be a specialized Abstract Syntax Tree ("AST") interpreter tailored to the expected schema of the input objects. The result of an interpretation of such an AST is an encoded string to be generated for any input object that matches the schema. Once an AST has been generated by the runtime, it can be compiled to very efficient machine code by means of partial evaluation by the JIT compiler 110. After partial evaluation, the compiled AST will consider all the property names as compilation constant, thus improving the performance of the encoding operation.

Specifically, object hidden classes may be used to produce efficient machine code for encoding operations. Object hidden classes may be used as a basis for generating an intermediate representation for an object with certain properties and types. Additionally, object hidden classes may allow the compiled code to efficiently check whether the input object has the hidden structure that it expects.

Thus, the code is specialized for the given object hidden class, and assumes that it will always have to encode objects with such hidden class. By exploiting this information, the names of the properties to be read can be treated as compilation constants and can perform constant time read of their values. Additionally, pre-initialized string tokens with pre-formatted JSON structure can be treated as compilation constants.

In an embodiment, when the type of an input object is not encoded in the intermediate representation because it is a reference to another object, the intermediate representation performs a call to another intermediate representation which will specialize on the hidden class of the next object in the object graph.

The generated code may also take into account the dynamic nature of the object graph, that is, it can generate different strings depending on the presence of certain fields that are known to be potentially absent or that have a nature that is too heterogeneous for generating a constant compilation unit.

For highly polymorphic scenarios (i.e. when too many properties are absent or have a very heterogeneous data type) the runtime de-optimizes the compiled code to a generic version that does not rely on runtime speculation, or utilizes another optimized encoder specialized for a different hidden class.

Direct Structure Decoding

Direct structure decoding is a parsing technique that enables the generation of efficient machine code that is specialized for accessing only the subset of the input data that is used by the application, avoiding unnecessary parsing operations. Additionally, all accesses to data are performed without materializing values in the runtime memory space that are not explicitly used.

In an embodiment, flow 300 is performed by a virtual machine that is part of the runtime environment.

Figure 3:
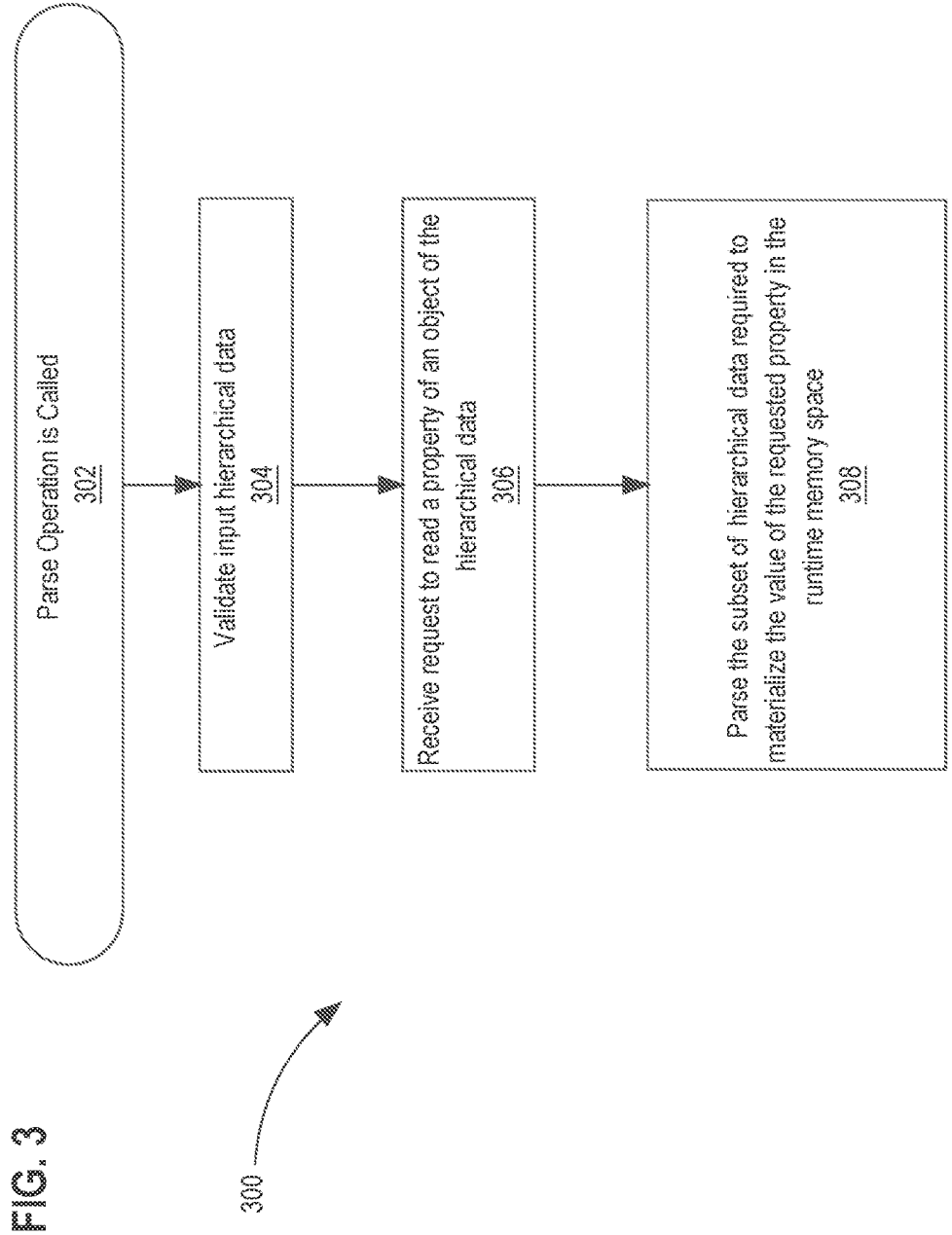
FIG. 3 is a flowchart illustrating steps for direct structure decoding.

FIG. 3 shows an example process flow 300 for direct structure decoding. Flow 300 is one example of a flow for direct structure decoding. Other flows may comprise fewer or additional elements, in varying arrangements.

In step 302, a parse operation is called. For example, a parse operation may be called by an external application or database 120 or by the runtime environment 102 via virtual machine 104 to parse hierarchical data.

In an embodiment, when a parse operation is called, no object materialization is performed. Rather, a proxy object is created that holds a reference to the input hierarchical data. This object is referred to as the virtualized object graph of the hierarchical data. At this stage, no parsing operations have been performed.

In step 304, input hierarchical data is validated. For example, hierarchically marked up data may be validated by the runtime environment 120 via virtual machine 104.

In an embodiment, after a virtual object is created, the input hierarchical data is validated without materializing its content in the runtime heap space. Validation may include a check for syntactical errors. The validation may require a full scan of the input hierarchical data, but does not require the allocation of the validated data in the runtime managed memory. During validation, the virtualized object graph corresponding to the data is populated with some minimal metadata that will be used to speed up the materialization of selected values at runtime. The metadata is called the parsing index. Once the object has been validated and no syntactical errors have been found, the virtual object is returned.

In step 306, a property is read by an application or external source. For example, an external application or database 120 may issue a request for data encapsulated by the hierarchically marked up data 124 that may be executing in the execution platform 126.

In step 308, the subset of hierarchical data is parsed that is required to materialize the value of the property in the runtime memory space. For example, the runtime environment 102 may parse the hierarchically marked up data 124 by using the decoder 108 and the value of the property may be stored in the managed memory 118.

In an embodiment, when a property of a virtualized object is read by the application, the virtualized object materializes its value in the runtime memory space. The runtime will parse only the subset of the input hierarchical data required to materialize the value of the property. The parsing is performed on the raw data, and the parser may start the parsing operation at any arbitrary position. The virtualized object graph will now store the value that has been parsed.

In an embodiment, the next time the same property is read by the application, its value will be read from the materialized (in-memory) representation, and no parsing operations will be performed anymore for that specific property on the raw data.

In an embodiment, if the value of the property that has been parsed is of object reference type its value is not materialized, and another virtual object is created instead. When one of the values of the new virtualized object graph is accessed, the parser will resolve the value by performing the correct incremental parsing operations.

Parsing Index

In an embodiment, in order to speed up parsing operations, the runtime stores its virtualized objects in a parsing index. The parsing index is used to keep track of the position of property values in the input hierarchical data, and is used by the runtime to keep track of potential parsing positions. With the goal of saving memory space, the index does not contain the name of the properties. Rather, the index only contains an array of initial parsing positions of property values corresponding to the order they appear in the input data.

In an embodiment, when a property is accessed, the runtime chooses the index to start the parsing step. Therefore, a parsing operation may start from the first index in the parsing index and then try all the successive one until the required property is found. As a consequence of this approach, parsing indexes are not strictly required by the parser runtime. If no index is found, the parser will simply continue its parsing operations from the beginning of the string, or from a recent parsing position.

Parser Specialization

An important consideration about the parsing approach is that all parsing steps are performed lazily, when the properties are read by the application. The lazy nature of the parsing approach allows for parsing operations to be effectively in-lined into the executable code, and can be specialized for every single access location. This allows the parser to avoid unnecessary operations on the subset of the object graphs that it needs to materialize.

In an embodiment, for each property value to be accessed, parsing is done using a specialized parser capable of retrieving the value of a single property using a special purpose parser that can access only a subset of the entire hierarchical mark up data syntax. Specialized parsers may be implemented using intermediate representations, and are compiled to machine code with the JIT compiler via partial evaluation.

In an embodiment, each specialized parser step corresponds to the combination of different, lightweight parsers that can recognize a valid subset of the hierarchical marked up data syntax. For example, depending on the position of a property to be parsed, the runtime may choose to parse only the N-th element of an array. In doing so, a specialized parser is used that can skip the body of all the elements in the array (delimited by the comma "," symbol). Such a specialized parser may potentially ignore the content of other array elements and simply look for the comma separation symbol. In this way, the parser can be considerably faster than a general purpose parser, as it does not need to match all the possible symbols that a normal parser would match. Furthermore, such a parser does not need to allocate and populate new objects in the runtime heap.

Software Overview

Figure 4:
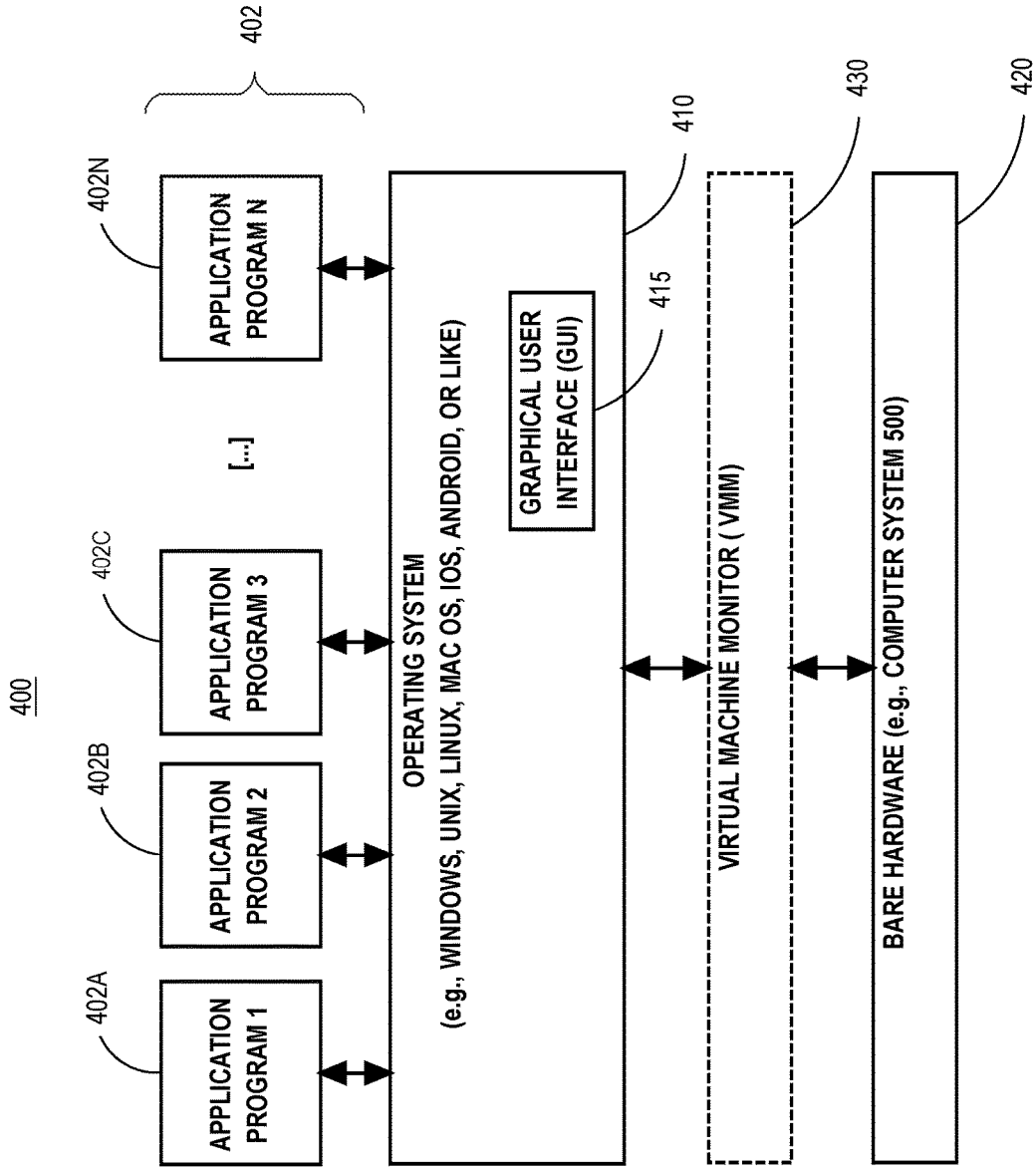
FIG. 4 is a block diagram of a basic software system that may be employed for controlling the operation of computing system 500.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

What is claimed is:

1. A method comprising:
   a virtual machine executing a body of code, wherein said virtual machine is configured to dynamically create attributes of objects referenced by said body of code and hidden classes used to store attributes of said objects referenced by said body code, wherein said virtual machine executing said body of code includes:
   determining whether a particular hidden class satisfies one or more encoding criteria for generating encoding machine code for encoding one or more particular instances of said hidden class;
   in response to determining that said particular hidden class satisfies said one or more encoding criteria:
   generating a particular encoding machine code to encode said one or more particular instances;
   executing said particular encoding machine code to encode a particular instance of said one or more particular instances;
   wherein the method is performed by one or more computing devices.

2. The method of claim 1, further comprising: generating an intermediate representation based on the attributes of objects referenced by said body of code.

3. The method of claim 2, wherein determining whether a particular hidden class satisfies one or more encoding criteria for generating encoding machine code for encoding one or more particular instances of said hidden class includes determining whether said hidden class matches an expected hidden class mapped to said intermediate representation.

4. The method of claim 2, wherein generating said particular encoding machine code to encode said one or more particular instances includes generating said particular encoding machine code based on said intermediate representation.

5. The method of claim 1, further comprising: in response to determining that said particular hidden class does not satisfy said one or more encoding criteria:
   generating generic encoding machine code to encode said one or more particular instances;
   executing said generic encoding machine code to encode a particular instance of said one or more particular instances.

6. The method of claim 1, further comprising:
   receiving a parse operation to parse a hierarchical data object;
   creating a proxy object in a runtime memory space that references the hierarchical data object;
   determining that the hierarchical data object is syntactically valid;
   in response to receiving a first request to read a particular property of the hierarchical data object:
   parsing a subset of hierarchical data from the hierarchical data object to materialize a value of the particular property in the proxy object.

7. The method of claim 6, wherein determining that the hierarchical data object is syntactically valid includes determining that the hierarchical data object is syntactically valid without materializing the value of the particular property in the runtime memory space.

8. The method of claim 6, further comprising:
   in response to receiving a second request to read the particular property of the hierarchical data object:
   returning the value of the particular property from the proxy object.

9. The method of claim 6, wherein determining that the hierarchical data object is syntactically valid includes storing a parsing index in the proxy object.

10. The method of claim 9, wherein the parsing index includes an array of initial parsing positions of one or more property values in the hierarchical data object.

11. A non-transitory computer-readable storage medium storing sequences of instructions that, when executed by one or more processors, cause:

a virtual machine executing a body of code, wherein said virtual machine is configured to dynamically create attributes of objects referenced by said body of code and hidden classes used to store attributes of said objects referenced by said body code, wherein said virtual machine executing said body of code includes:

determining whether a particular hidden class satisfies one or more encoding criteria for generating encoding machine code for encoding one or more particular instances of said hidden class;

in response to determining that said particular hidden class satisfies said one or more encoding criteria:

generating a particular encoding machine code to encode said one or more particular instances;

executing said particular encoding machine code to encode a particular instance of said one or more particular instances.

12. The non-transitory computer-readable storage medium of claim 11, the sequences of instructions including instructions that, when executed by said one or more processors, cause:

generating an intermediate representation based on the attributes of objects referenced by said body of code.

13. The non-transitory computer-readable storage medium of claim 12, wherein determining whether a particular hidden class satisfies one or more encoding criteria for generating encoding machine code for encoding one or more particular instances of said hidden class includes determining whether said hidden class matches an expected hidden class mapped to said intermediate representation.

14. The non-transitory computer-readable storage medium of claim 12, wherein generating said particular encoding machine code to encode said one or more particular instances includes generating said particular encoding machine code based on said intermediate representation.

15. The non-transitory computer-readable storage medium of claim 11, the sequences of instructions including instructions that, when executed by said one or more processors, cause:

in response to determining that said particular hidden class does not satisfy said one or more encoding criteria:

generating generic encoding machine code to encode said one or more particular instances;

executing said generic encoding machine code to encode a particular instance of said one or more particular instances.

16. The non-transitory computer-readable storage medium of claim 11, the sequences of instructions including instructions that, when executed by said one or more processors, cause:

receiving a parse operation to parse a hierarchical data object;

creating a proxy object in a runtime memory space that references the hierarchical data object;

determining that the hierarchical data object is syntactically valid;

in response to receiving a first request to read a particular property of the hierarchical data object:

parsing a subset of hierarchical data from the hierarchical data object to materialize a value of the particular property in the proxy object.

17. The non-transitory computer-readable storage medium of claim 16, wherein determining that the hierarchical data object is syntactically valid includes determining that the hierarchical data object is syntactically valid without materializing the value of the particular property in the runtime memory space.

18. The non-transitory computer-readable storage medium of claim 16, the sequences of instructions including instructions that, when executed by said one or more processors, cause:

in response to receiving a second request to read the particular property of the hierarchical data object:

returning the value of the particular property from the proxy object.

19. The non-transitory computer-readable storage medium of claim 16, wherein determining that the hierarchical data object is syntactically valid includes storing a parsing index in the proxy object.

20. The non-transitory computer-readable storage media of claim 19, wherein the parsing index includes an array of initial parsing positions of one or more property values in the hierarchical data object.

* * * * *